(12) United States Patent
Koli et al.

(10) Patent No.: US 10,146,454 B1
(45) Date of Patent: Dec. 4, 2018

(54) TECHNIQUES FOR PERFORMING DATA STORAGE COPY OPERATIONS IN AN INTEGRATED MANNER

(71) Applicant: EMC IP Holding Company LLC, Hopkinton, MA (US)

(72) Inventors: Milind M. Koli, Morrisville, NC (US); Timothy C. Ng, Cary, NC (US); James Mark Holt, Raleigh, NC (US); David Haase, Fuquay Varina, NC (US); Vedashree Raman, Germantown, MD (US)

(73) Assignee: EMC IP Holding Company LLC, Hopkinton, MA (US)

( * ) Notice: Subject to any disclaimer, the term of this patent is extended or adjusted under 35 U.S.C. 154(b) by 76 days.

(21) Appl. No.: 15/199,192

(22) Filed: Jun. 30, 2016

(51) Int. Cl.
G06F 12/00 (2006.01)
G06F 3/06 (2006.01)

(52) U.S. Cl.
CPC .......... *G06F 3/0619* (2013.01); *G06F 3/065* (2013.01); *G06F 3/067* (2013.01); *G06F 3/0659* (2013.01)

(58) Field of Classification Search
CPC ...... G06F 3/0619; G06F 3/067; G06F 3/0659; G06F 3/065
USPC .......................................................... 711/162
See application file for complete search history.

(56) References Cited

U.S. PATENT DOCUMENTS

| | | | |
|---|---|---|---|
| 6,047,294 A * | 4/2000 | Deshayes | G06F 11/1456 |
| 6,141,773 A * | 10/2000 | St. Pierre | G06F 11/1451 |
| | | | 711/162 |
| 7,363,418 B1 | 4/2008 | Westin et al. | |
| 7,886,298 B2 | 2/2011 | Lubbers et al. | |
| 8,380,931 B2 | 2/2013 | Rajvanshy et al. | |
| 8,775,718 B2 | 7/2014 | Kanevsky et al. | |
| 8,799,534 B2 | 8/2014 | Komikado | |
| 9,274,937 B2 | 3/2016 | Batwara et al. | |
| 9,454,368 B2 | 9/2016 | Vaghani et al. | |
| 9,483,186 B1 | 11/2016 | Lewis et al. | |
| 9,495,189 B2 | 11/2016 | Shu et al. | |
| 9,715,351 B2 | 7/2017 | Patočka | |

(Continued)

OTHER PUBLICATIONS

Milind M. Koli, et al., "Pairing of Data Storage Requests," U.S. Appl. No. 15/199,166, filed Jun. 30, 2016.

(Continued)

*Primary Examiner* — Tuan V Thai
*Assistant Examiner* — Tasnima Matin
(74) *Attorney, Agent, or Firm* — BainwoodHuang

(57) ABSTRACT

A method is provided for performance by an I/O Coordination module of a computing device operating as a data storage system in order to obtain and process physical extent mappings in the context of an XCOPY Lite or XCOPY type operation. The method involves breaking down the source region into physical source extents with reference to a container filesystem representing the logical volume of the source as a file. The I/O Coordination module is then able to separately process each of these physical source extents and also obtain its corresponding physical destination extents with reference to the container filesystem, which also represents the logical volume of the destination as a file. The I/O Coordination module is then able to cause integrated copy commands to be issued to an underlying physical storage driver. An apparatus, system, and computer program product for performing a similar method are also provided.

11 Claims, 6 Drawing Sheets

(56) References Cited

U.S. PATENT DOCUMENTS

2010/0186014 A1\* 7/2010 Vaghani ............... G06F 3/06
                                                    718/101
2010/0262727 A1\* 10/2010 Arndt ................ G06F 13/28
                                                    710/22
2015/0039815 A1   2/2015 Klein

OTHER PUBLICATIONS

Cormac Hogan, "VMware vSphere Storage APIs—Array Integration (VAAI)," Technical Marketing Documentation, Dec. 2012, Version 1.1, 19 pages.
Microsoft, "I/O request packets," Jul. 11, 2015, downloaded from <https://web.archive.org/web/20150711194252/https://msdn.microsoft.com/en-us/library/windows/hardware/hh439638(v=vs.85).aspx>.
"Working Draft SCSI Extended Copy Command," Apr. 2, 1999, T10/99-143r1, 34 pages.

\* cited by examiner

US 10,146,454 B1

TECHNIQUES FOR PERFORMING DATA STORAGE COPY OPERATIONS IN AN INTEGRATED MANNER

BACKGROUND

Data storage systems (DSSes) are integrated systems that allow persistent data storage to be presented to remote host devices in an efficient manner. A host may transmit data storage commands to the DSS for processing. A DSS may be configured as one or more storage processors attached to underlying persistent storage, each storage processor being configured to process data storage commands.

In order to reduce host and network overhead, certain operations may be offloaded to the DSS. For example, Windows-based XCOPY Lite and VMware vSphere® Storage APIs—Array Integration (VAAI) XCOPY allow a host to instruct the DSS to transfer data from one location on the DSS to another location on the DSS without transferring the data to the host over the network.

SUMMARY

Unfortunately, the above-described techniques may suffer from deficiencies. For example, a DSS may be configured to process an XCOPY Lite or XCOPY command by having a data mover library driver of a storage processor receive the command and pass it down a storage stack by making related source and destination inter-driver calls to respectively set the source location and destination location of the XCOPY. However, since two separate commands are used, drivers along the storage stack are generally not aware of the relationship between the commands, and the ultimate physical storage driver at the bottom of the stack must independently negotiate the XCOPY with the data mover library driver causing inefficiencies in the copying process. For example, because the driver stack may introduce address mapping between logical and physical devices, the mappings between source and destination may become unaligned. Since the driver stack is not aware of the relationship between the two commands, however, the physical storage driver at the bottom of the stack does not know about the misalignment. Thus, the XCOPY must be broken up into several pieces, parts of which will fail, leading the inter-driver commands to be sequentially reissued for smaller and smaller chunks until it finally completes.

Thus, it would be desirable to allow a mapping driver in the driver stack to process and align physical storage extent divisions in both the source and the destination inter-driver calls from the XCOPY command in order to make integrated copy calls down to the physical storage driver at the bottom of the stack.

In one embodiment, a method is performed by an I/O Coordination module of a computing device operating as a DSS. The method includes (a) receiving a logical source descriptor structure that specifies a logical source disk, a logical source offset, and a length for a copy operation, (b) receiving a logical destination descriptor structure that specifies a logical destination disk and a logical destination offset for the copy operation, (c) requesting a physical mapping of the source descriptor structure from a container filesystem configured to present a file as a logical disk, (d) in response to requesting the physical mapping of the source descriptor structure, receiving a first set of storage extent descriptors, each storage extent descriptor of the first set describing a respective physical storage extent, the first set representing a mapping of the source descriptor structure onto physical storage, and (e) for each storage extent descriptor of the first set: (1) requesting a physical mapping of a corresponding location of the logical destination descriptor structure from the container filesystem, (2) in response to requesting the physical mapping of the corresponding location, receiving a second set of storage extent descriptors, each storage extent descriptor of the second set describing a respective physical storage extent, the second set representing a mapping of the corresponding location of the destination descriptor structure onto physical storage, and (3) sending a copy request to a physical storage driver directing the physical storage driver to copy data from the physical storage extent of that storage extent descriptor of the first set to the physical storage extents of the second set. An apparatus, system, and computer program product for performing a similar method are also provided.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

DETAILED DESCRIPTION

Embodiments are directed to techniques for allowing a mapping driver in a driver stack to process and align physical storage extent divisions in both source and destination inter-driver calls from an XCOPY command in order to make integrated copy calls down to a physical storage driver at the bottom of the stack.

Figure 1:
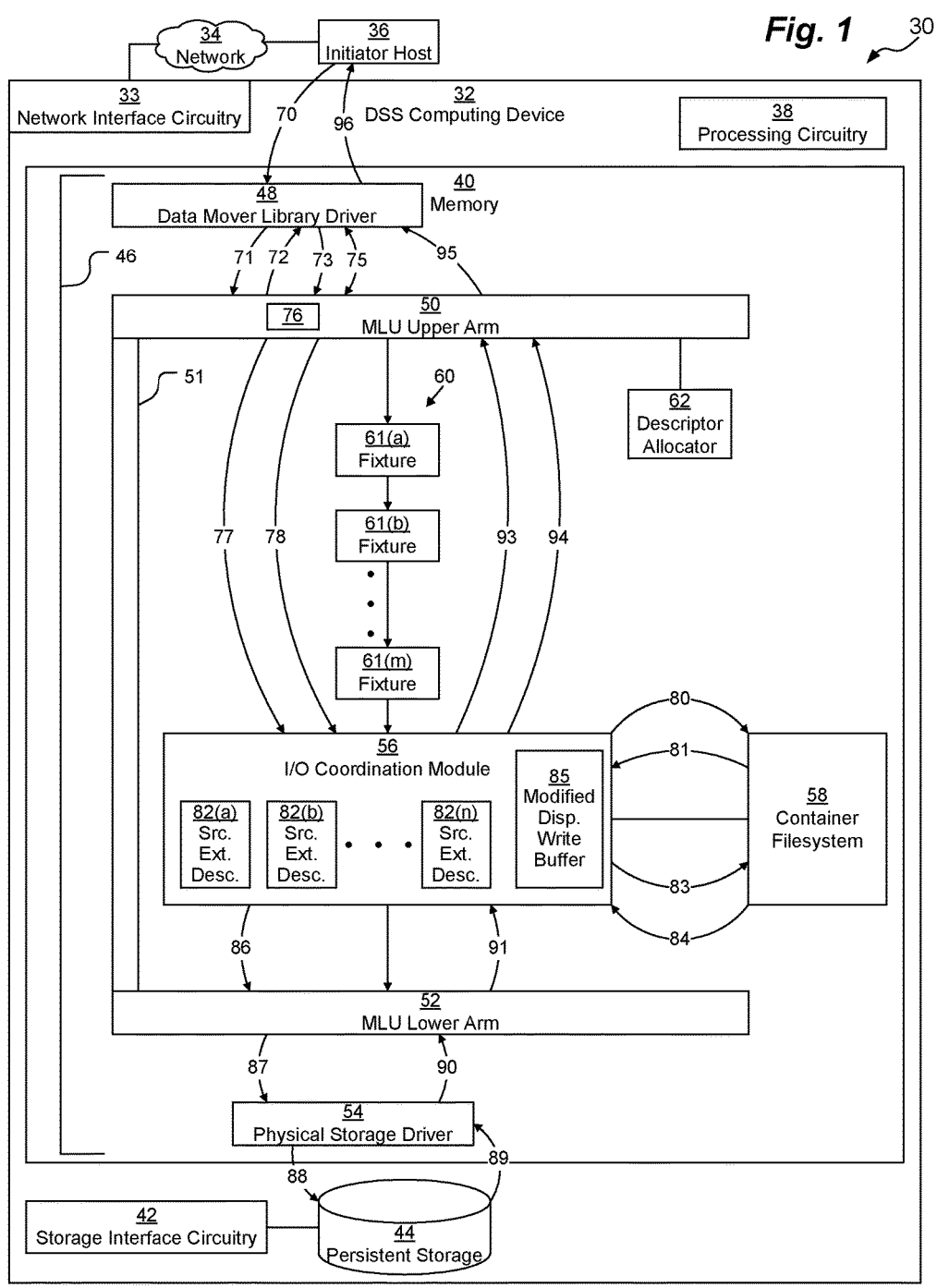
FIG. 1 is a block diagram depicting an example system and apparatus for use in connection with various embodiments.

FIG. 1 depicts a system 30. System 30 includes a computing device 32 serving as a data storage system (DSS), a network 34, and one or more hosts 36 that may serve as initiators of commands to the DSS computing device 32 over the network 34. In some embodiments, system 30 may also include one or more other devices connected to computing device 32 over network 34. Computing device 32 may be any kind of computing device, such as, for example, a personal computer, workstation, server computer, enterprise server, DSS cabinet, laptop computer, tablet computes, smart phone, mobile computer, etc. Typically, computing device 32 is a DSS.

Host 36 may be any kind of computing device capable of sending data storage commands to computing device 32 over network 34, such as, for example, a personal computer, workstation, server computer, enterprise server, laptop computer, tablet computes, smart phone, mobile computer, etc. Typically, host 36 is a workstation, server computer, or enterprise server. In some embodiments, host 36 may run a hypervisor (not depicted), allowing various virtual machines (not depicted) to execute in a virtualized environment (not depicted) thereon.

Computing device 32 includes network interface circuitry 33, processing circuitry 38, storage interface circuitry 42, persistent data storage 44, and memory 40. Computing device 32 may also include other components as are well-known in the art.

Network interface circuitry 33 may include one or more Ethernet cards, cellular modems, FC adapters, Wireless Fidelity (Wi-Fi) wireless networking adapters, and/or other devices for connecting to network 34. Processing circuitry 38 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Persistent storage 44 may include any kind of persistent storage devices, such as, for example, hard disk drives, solid-state storage devices, flash drives, etc. Storage interface circuitry 42 controls and provides access to persistent storage 44. Storage interface circuitry 42 may include, for example, SCSI, SAS, ATA, SATA, Fibre Channel (FC), and/or other similar controllers and ports. Persistent storage 44 may be arranged in various configurations, such as, for example in RAID groups that provide storage striped or mirrored across several disks (with optional parity data, e.g., in RAID-5) as RAID disks. In some embodiments, each RAID disk may be subdivided into Flare LUNs, which may themselves be subdivided into slices (not depicted) of, for example, 256 MB or 1 gigabyte size. These slices may be assigned as backing store to a container filesystem manager 58 (e.g., the Common Block Filesystem provided by EMC Corp. of Hopkinton, Mass.). Container filesystem manager 58 manages one or more files backed by these slices in a mapped manner, and container filesystem manager 58 is then able to present one or more of these files to host 36 as one or more respective logical disks.

Memory 40 may be any kind of digital system memory, such as, for example, random access memory (RAM). Memory 40 stores one or more operating systems (OSes) in operation (e.g., Linux, UNIX, Windows, MacOS, or a similar operating system; not depicted), various applications (not depicted) executing on processing circuitry 38, and various drivers 48, 51, 54 (and their respective subcomponents) some of which may be arranged in a driver stack 46. Memory 40 also includes a container filesystem manager 58 in operation.

In some embodiments, memory 40 may also include a persistent storage portion (not depicted). Persistent storage portion of memory 40 may be made up of one or more persistent storage devices, such as, for example, disks. Persistent storage portion of memory 40 or persistent storage 44 is configured to store programs and data even while the computing device 32 is powered off. The OS and the applications are typically stored in persistent storage 44 so that they may be loaded into a system portion of memory 40 from persistent storage 44 upon a system restart. These applications and drivers 48, 51, 54, when stored in non-transient form either in the volatile portion of memory 40 or in persistent storage 44 or in persistent portion of memory 40, form a computer program product. The processing circuitry 38 running one or more of these applications or drivers 48, 51, 54 thus forms a specialized circuit constructed and arranged to carry out the various processes described herein.

Memory 40 stores at least three drivers 48, 51, 54 that operate as part of storage driver stack 46. At the top of driver stack 46 is a data mover library driver 48 which interfaces with host 36 and provides access to logical disks presented by the container filesystem manager 58 so that the host 36 can issue storage commands to the data mover library driver 48 and receive respective responses from the data mover library driver 48. In the middle of driver stack 46 is a mapping driver 51 (also referred to as the MLU), and at the bottom of the driver stack 46 is a physical storage driver 54 that is able to communicate with the storage interface circuitry 42, providing the MLU 51 with access to the individual slices, FLUs, and RAID disks of persistent storage 44. In some embodiments there may be additional drivers (not depicted) within driver stack 46 above and/or below the MLU 51.

MLU 51 is a multi-part driver having an upper arm 50 and a lower arm 52. In addition, MLU 51 is arranged in a "C-Clamp" configuration, allowing it to communicate with various other software modules without using inter-driver communication. A fixture stack 60 includes a stack of fixture modules 61 (depicted as fixtures 61(a), 61(b), . . . 61(m)). I/O Coordination module 56 sits at the bottom of the fixture stack 60. Upper arm 50 is able to send I/O descriptors, which it obtains from descriptor allocator module 62, down the fixture stack 60 towards the lower arm 52. This allows the various fixtures 61 and I/O Coordination module 56 to make various changes and translations to storage operations prior to final processing by the lower arm 52 of the MLU 51. Fixtures 61 typically perform services ancillary to storage. An example fixture 61 is a compression module, while another example fixture is a de-duplication module.

In operation, host 36 sends a combined storage command 70 (e.g., an XCOPY Lite or VAAI XCOPY command, generically referred to as an XCOPY command) to data mover library driver 48. For example, in the case of an XCOPY command, the combined storage command 70 requests that data be copied from a source to a destination. The source and destination may each be specified by referring to a specific logical disk presented by the container filesystem manager 58 and an offset (e.g., in blocks) and length (e.g., in blocks also). For example, the XCOPY command may indicate that Logical disk 7 at offset 10 should be copied to logical disk 5 at offset 243, the copied region having a length of 15 blocks.

Command 70 is referred to as being a "combined" command because data mover library driver 48 breaks the command into two parts 71, 73. In the case of an XCOPY, inter-driver source command 70 lists a command type of copy source and specifies a source location in the host's address space (i.e., a logical location on a logical disk) from where the data is to be copied. Typically this source location includes a logical disk number, an offset, and a length.

Also in the case of an XCOPY, inter-driver destination command 73 lists a command type of copy destination and specifies a destination location in the host's address space (i.e., a logical location on a logical disk) to where the data is to be copied. Typically this destination location includes a logical disk number and an offset. The length is not needed since it is already specified in the inter-driver source command 70, but, in some embodiments, it may be included anyway.

Inter-driver commands 71, 73 may take the form of I/O Request Packets (IRPs) holding an IOCTL or DeviceIoControl system call as is well-known in the art.

In one embodiment, data mover library driver 48 sends inter-driver source command 71 down the storage driver stack 46 to the MLU 51. Upon receipt, upper arm 50 of the MLU 51 sends back an inter-driver rendezvous command 72 requesting a paired command. In response to rendezvous command 72, data mover library driver 48 sends inter-driver destination command 73 down the storage driver stack 46 to the MLU 51. In response, upper arm 50 and data mover library driver 48 perform a rendezvous pairing negotiation 75, resulting in a pairing structure 76 being generated within upper arm 50 to indicate that inter-driver commands 71, 73 are paired as siblings.

In order to fulfill the pair of commands 71, 73, upper arm 50 creates (e.g., by calling descriptor allocator 62) a destination I/O descriptor (IOD) data structure 77 and a source IOD data structure 78 and sends those down the fixture stack 60 to the I/O Coordination module 56. In one embodiment upper arm 50 sends destination IOD 77 prior to sending the source IOD 78. The source IOD 78 and destination IOD 77 also contain the source location and destination location respectively in the logical address space. In one embodiment, an IOD 77, 78 has a stacked data structure with a public field at the top and a set of private fields that hold data specific to specific fixtures 61 in the fixture stack 60. In addition, there may be shared fields between the private fields that allow adjacent fixtures 61 to pass information from one to the next. The logical source location may be stored within the public field of source IOD 78, and the logical destination location may be stored within the public field of destination IOD 77. Further detail with respect to what is stored within the public field of source IOD 78 may be found below in connection with FIG. 2. Further detail with respect to what is stored within the public field of destination IOD 77 may be found below in connection with FIG. 3.

I/O Coordination module 56 serves to coordinate storage-related operations between the MLU 51 and the container filesystem manager 58. Thus, when it receives the destination IOD 77 and source IOD 78, it sends a Map_for_Read command 80 to container filesystem manager 58 in order to obtain a Map_for_Read response 81 mapping of the logical source location to physical storage, which may take the form of a set of source extent descriptors 82 (depicted as source extent descriptors 82(a), 82(b), . . . , 82(n)). This may be illustrated with reference to FIG. 2.

Figure 2:
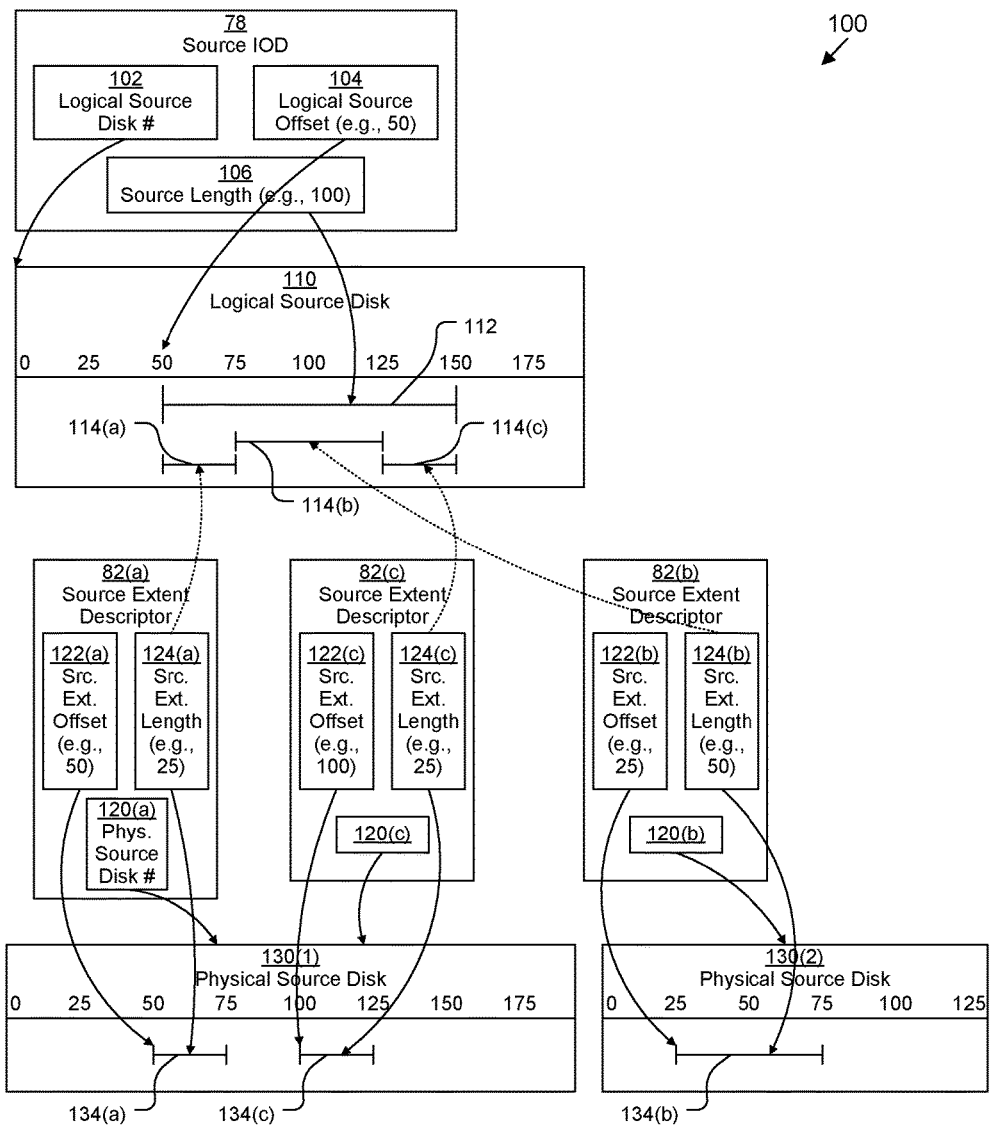
FIG. 2 is a block diagram depicting an example relationship between data structures for use in connection with various embodiments.

FIG. 2 illustrates an example arrangement 100 of source mapping. Source IOD 78 includes a logical source disk identifier 102 (such as a logical unit number [LUN]), a logical source offset 104, and a source length 106. As depicted in the example, the logical source identifier 102 identifies logical source disk 110, logical source offset 104 indicates that the source starts at an offset of 50 blocks (e.g., 8-kilobyte-sized blocks) into the logical source disk 110, and source length 106 indicates that the source to be copied is 100 blocks long. This corresponds to a logical source region 112 from block 50 through (but not including) block 150 of logical source disk 110. The Map_for_Read command 80 returns a set of source extent descriptors 82 (depicted as three source extent descriptors 82(a), 82(b), 82(c)). Each source extent descriptor 82 includes a respective physical disk identifier 120, physical source extent offset 122, and physical source extent length 124. It can be seen that logical source region 112 may be broken up into three divisions, regions 114(a), 114(b), and 114(c) which are each backed by different physically-contiguous source extents 134(a), 134(b), 134(c), respectively. As depicted, physical source extent 134(a) is on physical source disk 130(1) (as identified by physical source disk identifier 120(a)), beginning at block 50 (as identified by physical source extent offset 122(a)) and extending for 25 blocks (as identified by physical source extent length 124(a)). Physical source extent 134(b) is on physical source disk 130(2) (as identified by physical source disk identifier 120(b)), beginning at block 25 (as identified by physical source extent offset 122(b)) and extending for 50 blocks (as identified by physical source extent length 124(b)). Physical source extent 134(c) is on physical source disk 130(1) (as identified by physical source disk identifier 120(c)), beginning at block 100 (as identified by physical source extent offset 122(c)) and extending for 25 blocks (as identified by physical source extent length 124(c)).

It should be noted that it is possible for a logical source region 114(q) (for some value q; all characters based on q are not actually depicted) to not actually be backed by any underlying physical source extent 134(q) (the unallocated backing store case). In such a case, in some embodiments, the corresponding source extent descriptor 82(q) may include a null value for 120(q), 122(q).

Once the allocated physical source extents 134 have been identified with reference to the source extent descriptors 82, I/O Coordination module 56 may perform a set of operations on each identified allocated physical source extent 134. Thus, for a particular allocated physical source extent 134(x), I/O Coordination module 56 identifies the physical destination locations to be written to for that physical source extent 134(x). I/O Coordination module 56 begins by sending a Map_for_Write command 83 to container filesystem manager 58 for that particular allocated physical source extent 134(x) in order to obtain a disparate write buffer 84 in response, effectively mapping the logical destination locations corresponding to logical source region 114(x) to physical storage, making modifications to the disparate write buffer 84 to yield a modified disparate write buffer 85, and then issuing a copy command 86 and receiving a copy response 91. This may be illustrated with reference to FIG. 3.

Figure 3:
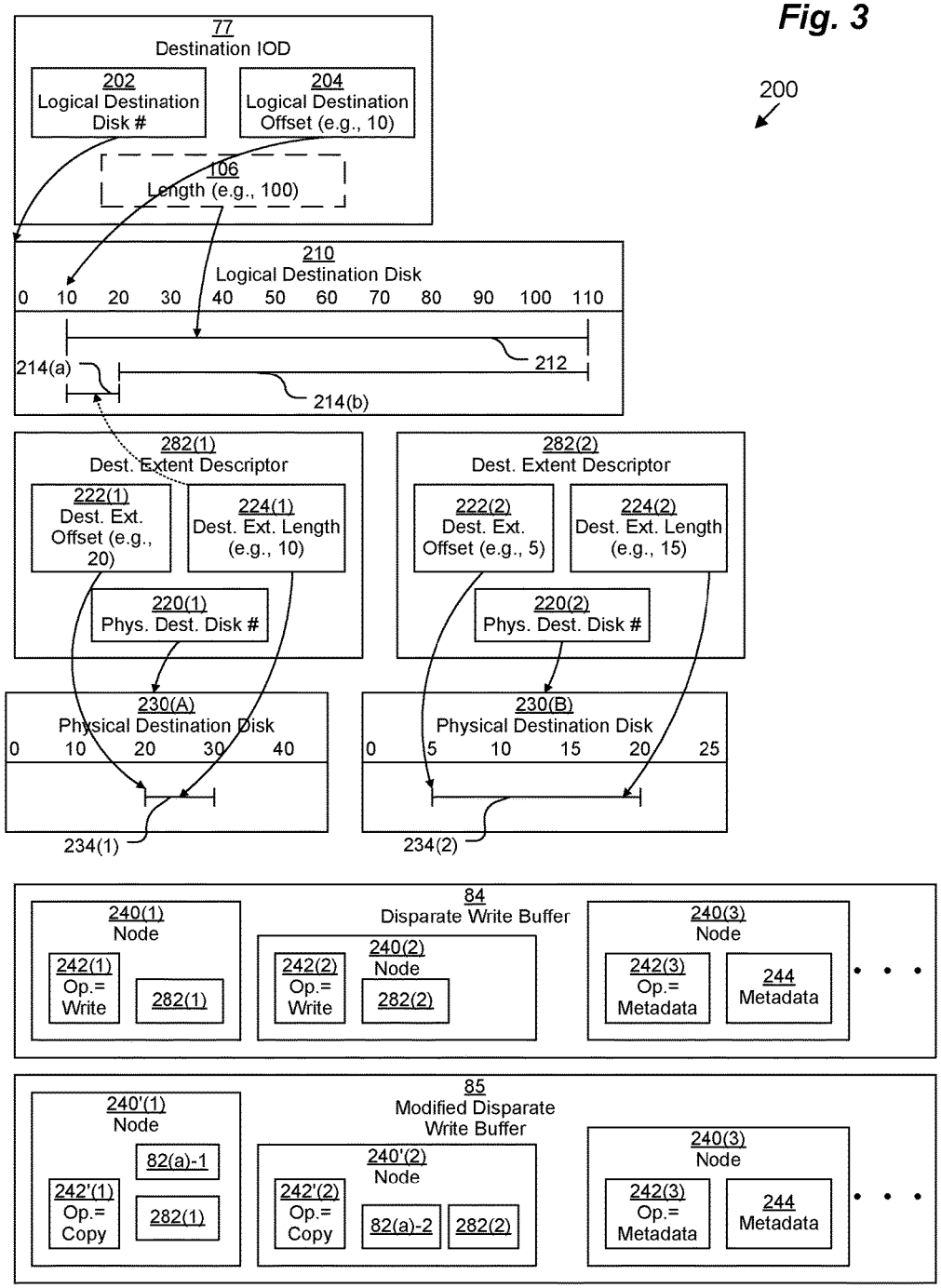
FIG. 3 is a block diagram depicting an example relationship between data structures for use in connection with various embodiments.

FIG. 3 illustrates an example arrangement 200 of destination mapping. Destination IOD 77 includes a logical destination disk identifier 202 (such as a LUN), a logical destination offset 204, and, optionally, a destination length (which is the same as source length 106). As depicted in the example, the logical destination identifier 202 identifies logical destination disk 210, logical destination offset 204 indicates that the destination starts at an offset of 10 blocks into the logical destination disk 210, and length 106 indicates that the destination to be copied to is 100 blocks long. This corresponds to a logical destination region 212 from block 10 through (but not including) block 110 of logical destination disk 210. As depicted, logical destination region 212 may be broken up into two divisions, regions 214(a) (having length 10) and 214(b) (having length 90) which are each backed by different respective physically-contiguous destination extents (not depicted).

FIG. 3 also illustrates what the Map_for_Write command 83 returns for a first allocated physical source extent 134(a), as an example. Since allocated physical source extent 134(a) has a length 124(a) of 25 blocks, the corresponding portions of logical destination region 212 will include all of region 214(a) and only the first 15 blocks of region 214(b). Thus the returned disparate write buffer 84 for first allocated physical source extent 134(a) includes two destination extent descriptors 282(1), 282(2). Each destination extent descriptor 282 includes a respective physical destination disk identifier 220, physical destination extent offset 222, and physical destination extent length 224, which combine to define a respective physically-contiguous destination extent 234. As depicted, physical destination extent 234(1) is on physical destination disk 230(A) (as identified by physical destination disk identifier 220(1)), beginning at block 20 (as identified by physical destination extent offset 222(1)) and extending for 10 blocks (as identified by physical destination extent length 224(1)). Physical destination extent 234(2) is on physical destination disk 230(B) (as identified by physical destination disk identifier 220(2)), beginning at block 5 (as identified by physical destination extent offset 222(2)) and extending for 15 blocks (as identified by physical destination extent length 224(2)).

Received disparate write buffer 84 includes a set of nodes 240 (depicted as nodes 240(1), 240(2), 240(3), . . . ). Each node 240 may include an operation code 242. Some of the nodes (e.g., nodes 240(1) and 240(2)) correspond to the physical destination extents 234; thus node 240(1) includes destination extent descriptor 282(1) and node 240(1) includes destination extent descriptor 282(1). For these nodes, the operation code 242 is a write code, because the Map_for_Write command is normally used to return instructions for writing to physical extents. Returned disparate write buffer 84 may also include one or more additional nodes 240 (e.g., node 240(3)) having a metadata operation code 242(3) and storing metadata 244 to also be written to physical storage. This metadata 244 may be, for example, metadata used in a journaling filesystem (e.g., PFDC).

Because I/O Coordination module 56 is not interested in performing a simple write operation but rather wants the physical storage driver 54 to perform a copy operation, I/O Coordination module 56 modifies the received disparate write buffer 84 to create a modified disparate write buffer 85 (although, in some embodiments, I/O Coordination module 56 may make the modifications directly to the received disparate write buffer 84 without making a copy) that will be useful for copying. In particular, I/O Coordination module 56 modifies the operation codes 242(1), 242(2) from being write commands to become copy commands in modified operation codes 242'(1), 242'(2). In addition, I/O Coordination module 56 also inserts a source descriptor for each copy operation into the modified nodes 240'. Thus, modified node 240'(1) now becomes a copy operation from a physical location defined by physical source descriptor 82(a)-1 to a physical location (i.e., region 234(1)) defined by physical destination descriptor 282(1), and modified node 240'(2) now becomes a copy operation from a physical location defined by physical source descriptor 82(a)-2 to a physical location (i.e., region 234(2)) defined by physical destination descriptor 282(2). The physical location defined by physical source descriptor 82(a)-1 and the physical location defined by physical source descriptor 82(a)-2 are both subsets of the physical location defined by physical source descriptor 82(a). Metadata node 240(3) is not modified in modified disparate write buffer 85.

I/O Coordination module 56 sends a copy instruction 86 down to lower arm 52. In some embodiments, the copy instruction 86 includes the modified disparate write buffer 85 or a pointer to the modified disparate write buffer 85, while in other embodiments, copy instruction 86 at least includes information allowing the various copy operations described by nodes 240'(1), 240'(2) to be reconstructed. Lower arm 52 is then able to use this information to send at least one inter-driver copy command 87 down the driver stack 46 to the physical driver 54. Inter-driver copy command 87 may take the form of an IRP holding an IOCTL or DeviceIoControl system call. In some embodiments, one inter-driver copy command 87 may include several (or all) copy commands from the various nodes 240' having copy operation codes 242'. In other embodiments, lower arm 52 breaks up the copy commands from the various nodes 240' having copy operation codes 242' into a separate inter-driver copy command 87 for each. In any case, physical storage driver 54 performs the one or more inter-driver copy commands 87 by sending one or more low-level copy commands 88 (or constituent sub-commands) to persistent storage 44, receiving low-level copy responses 89 in response. Then, physical storage driver 54 is able to issue a response 91 for each copy instruction 86 back to the I/O Coordination module 56. I/O Coordination module 56 may then repeat for each remaining identified allocated physical source extent 134.

Once I/O Coordination module 56 completes the copy for all of the identified allocated physical source extents 134, it may send a completion IOD 93, 94 back up the fixture stack 60 to the upper arm 50 to indicate completion (whether success or failure) of each of destination IOD 77 and source IOD 78. Because upper arm 50 knows that these IODs are paired together by pairing structure 76, it is then able to send a unified inter-driver response 95 back to the data mover library driver 48 indicating either success on both destination IOD 77 and source IOD 78 or failure (if either destination IOD 77 and source IOD 78 failed). Data mover library driver 48 is then able to send an XCOPY response 96 indicating either the success or failure of the XCOPY back to the inititator host 36.

Although described in the context of an XCOPY operation, the pairing aspect may be used in other contexts as well, such as, for example, for mirrored write operations.

Figure 4:
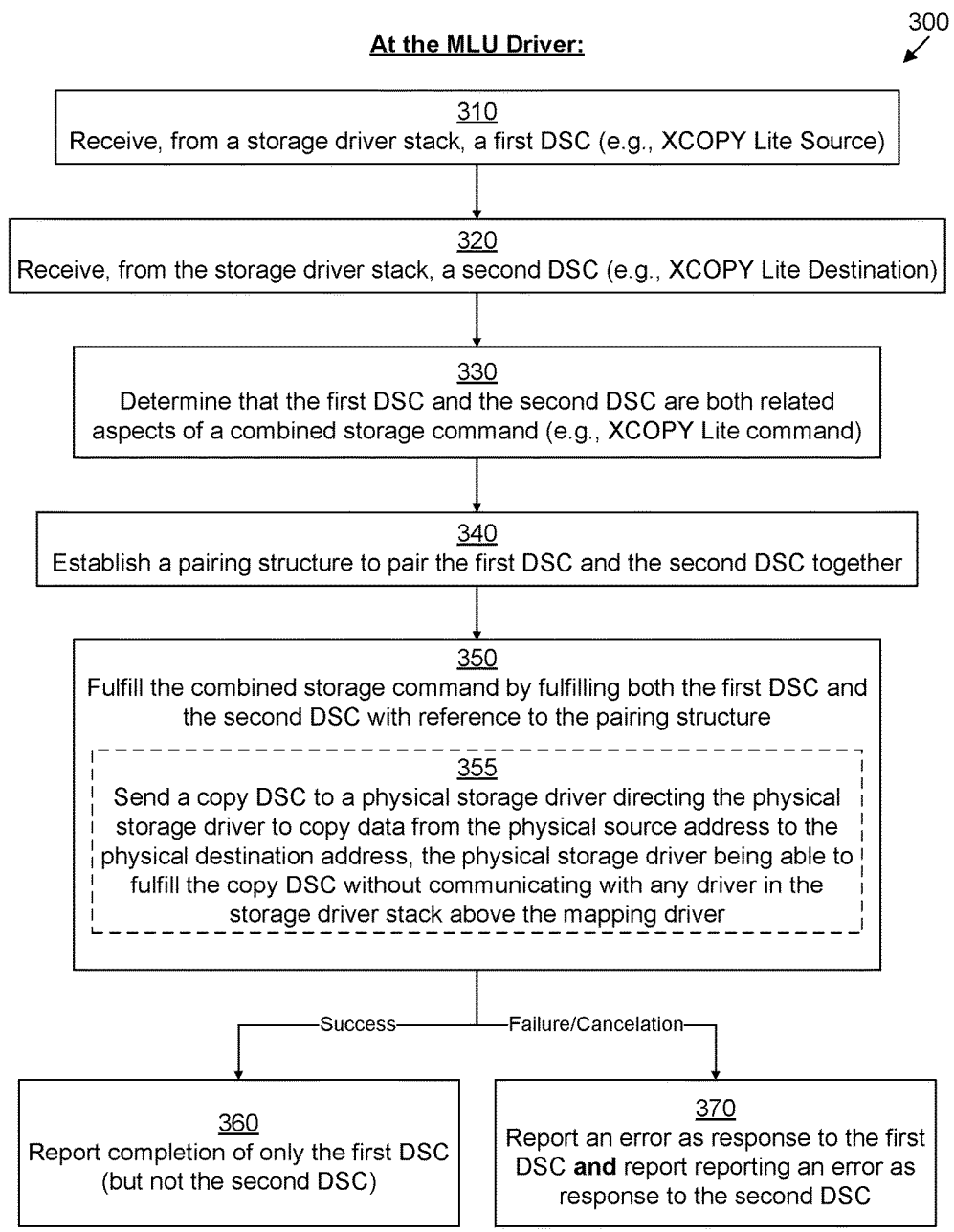
FIG. 4 is a flowchart depicting example methods of various embodiments.

FIG. 4 illustrates an example method 300 performed by computing device 32. It should be understood that any time a piece of software (e.g., drivers 48, 51, 54 or their components; fixtures 61; I/O Coordination module 56; container filesystem manager 58; etc.) is described as performing a method, process, step, or function, in actuality what is meant is that the computing device 32 on which that piece of software is running performs the method, process, step, or function when executing that piece of software on its processing circuitry 38.

It should be understood that, within FIG. 4, sub-step 355 is drawn with a dashed border because it is only used in some embodiments of method 300. In addition, one or more of the other steps or sub-steps of method 300 may also be omitted in some embodiments. Similarly, in some embodiments, one or more steps or sub-steps may be combined together or performed in a different order. Method 300 is performed by computing device 32, more specifically by mapping driver/MLU 51 running on processing circuitry 38 in conjunction with various other system components.

Preliminarily, before step 310, initiator host 36 sends a combined storage command (e.g., an XCOPY command; a write command directed at a mirrored location; etc.) to a top-level driver (e.g., data mover library driver 48) of a storage driver stack 46 running on computing device 32. That top-level driver 48 then splits the combined storage command into at least two related sub-commands 71, 73, each of which may be considered a data storage command (DSC) in its own right. A DSC may take the form of an IRP having an IOCTL, for example. For example, an XCOPY command may be split into an inter-driver source copy command an inter-driver destination copy command, while a write command directed at a mirrored area may be split into two inter-driver write commands, each directed at a different one of the mirrored destinations.

In step 310, MLU 51 (e.g., at its upper arm 50) receives a first DSC (e.g., inter-driver command 71) from storage driver stack 46. Since this DSC was received first, it may be designated as the primary command.

In step 320, MLU 51 (e.g., at its upper arm 50) receives a second DSC (e.g., inter-driver command 73) from storage driver stack 46. Since this DSC was received second, it may be designated as the secondary command. The first and secondary commands are peer commands, but the primary command may be the one that is reported back on if there is no error. In some embodiments, step 320 is performed in response to the MLU 51 requesting a second DSC from the data mover library driver 48 having a same identifier as the DSC received in step 310 (indicating that the two DSCs are related).

In step 330, MLU 51 (e.g., at its upper arm 50) may determine that the first and second DSCs 71, 73 are both related aspects of a single combined storage command 70. This may be done intrinsically by receiving the second DSC 73 in response to requesting a related DSC or MLU 51 may recognize that the DSCs 71, 73 are related in some other manner (e.g., by comparing a token or identifier delivered therewith).

In step 340, in response to determining (in step 330) that the two DSCs 71, 73 are related, MLU 51 (e.g., at its upper arm 50) establishes a pairing structure 76 to pair the two related DSCs 71, 73 together.

In step 350, MLU 51 (e.g., upper arm 50 in communication with fixture stack 60 and lower arm 52) fulfills the combined storage command 70 by fulfilling both DSCs 71, 73 with reference to the pairing structure 76. In one embodiment (e.g., when the combined storage command 70 is an XCOPY command), the lower arm 52 (e.g., based on an instruction 86 from the I/O Coordination module 56) sends a "copy" DSC 87 to physical storage driver 54 directing the physical storage driver 54 to copy data from a physical source address to a physical destination address, the physical storage driver 54 being able to fulfill the copy DSC 87 without communicating with any driver in the storage driver stack 46 above the mapping driver 50. This is in contrast to other approaches in which mapping driver 51 sends separate read and write DSCs to the physical storage driver 54, which then must communicate back with the data mover library driver 48 to determine that the data that is read from the source is to be written to the same buffer that will be written to the destination. In some embodiments, step 350 is performed in conjunction with method 400 as described below in connection with FIG. 5.

If the combined storage command 70 is successfully fulfilled by the MLU 51, then operation proceeds with step 360. In step 360, MLU 51 (e.g., at its upper arm 50) reports completion of the primary DSC 71 identified by the paired structure 76 by sending inter-driver response 95 back to the data mover library driver 48 in response to the first DSC 71. No response is sent back to the data mover library driver 48 in response to the second DSC 73.

If the combined storage command 70 is not successfully fulfilled by the MLU 51 (e.g., if there is an error or if the initiator host 36 sends a cancellation command that is able to terminate the paired DSCs 71, 73 before completing), then operation proceeds with step 370. In step 370, MLU 51 (e.g., at its upper arm 50) reports an error on both DSCs 71, 73 identified by the paired structure 76 by sending a first inter-driver error response 95 back to the data mover library driver 48 in response to the first DSC 71 and a second inter-driver error response 95 back to the data mover library driver 48 in response to the second DSC 73.

Figure 5:
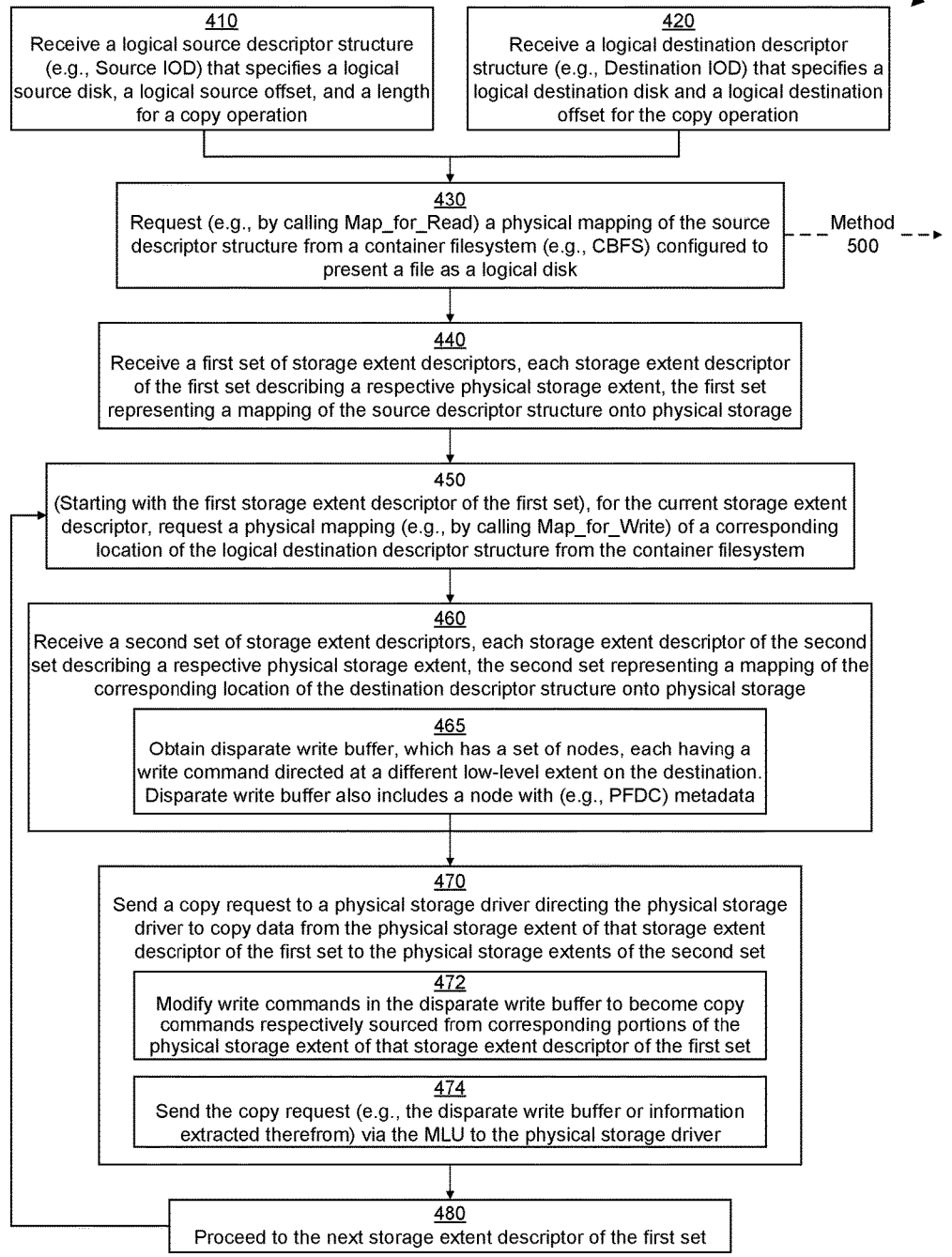
FIG. 5 is a flowchart depicting example methods of various embodiments.

FIG. 5 illustrates an example method 400 performed by computing device 32. It should be understood that, within FIG. 5, various steps or sub-steps of method 400 may be omitted in some embodiments. Similarly, in some embodiments, one or more steps or sub-steps may be combined together or performed in a different order. Method 400 is performed by computing device 32, more specifically by I/O Coordination module 56 running on processing circuitry 38 in conjunction with various other system components.

Preliminarily, before steps 410 and 420, upper arm 50 sends destination IOD 77 and source IOD 78 down the fixture stack 60 towards the I/O Coordination module 56 as part of an XCOPY command, as described above.

In step 410, I/O Coordination module 56 receives a logical source descriptor structure (e.g., Source IOD 78) that specifies a logical source disk 110 (e.g., using logical source disk identifier 102), a logical source offset 104, and a length 106 for a copy operation. In parallel, in step 420, I/O Coordination module 56 receives a logical destination descriptor structure (e.g., Destination IOD 77) that specifies a logical destination disk 210 (e.g., using logical destination disk identifier 202), and a logical source offset 204 for the copy operation.

Then, in step 430, I/O Coordination module 56 requests (e.g., by calling Map_for_Read) a physical mapping of the source IOD 78 from a container filesystem manager 58 (e.g., CBFS) configured to present a file as a logical disk.

In step 440, I/O Coordination module 56 receives, in response to the Map_for_Read request 80 of step 430, a first set of storage extent descriptors (e.g., source extent descriptors 82) each storage extent descriptor 82 of the first set describing a respective physical storage extent 134, the first set representing a mapping of the source descriptor structure onto physical storage. The first set of storage extent descriptors includes only source extent descriptors 82 that point to actual physical storage extents 134. However, if there are any received source extent descriptors 82 that have null pointers (i.e., the underlying storage is not allocated), then those are excluded from the first set and are instead part of the third set of method 500, below. If there is a third set of received source extent descriptors 82 that have null pointers, then those are processed separately in method 500 at this point.

In step 450, I/O Coordination module 56 begins going through the physical source extent descriptors of the first set one at a time. For a current physical source extent descriptor 82(*x*), I/O Coordination module 56 requests a physical mapping (e.g., by calling Map_for_Write) of a corresponding location of the logical destination descriptor structure (e.g., destination IOD 77) from the container filesystem manager 58. Thus for example, referring to FIG. 2, when the current physical source extent descriptor 82(*x*) is physical source extent descriptor 82(2), since it corresponds to logical source offsets 25 through 75, Map_for_Write is called on logical offsets 25 through 75 of logical destination region 212 as identified by destination IOD 77.

Then, in step 460, in response to the Map_for_Write request 83, I/O Coordination module 56 receives a second set of storage extent descriptors (e.g., physical destination extent descriptors 282), each storage extent descriptor of the second set describing a respective physical storage extent 234, the second set representing a mapping of the corresponding location of the destination descriptor structure (e.g., destination IOD 77) onto physical storage. In some embodiments, step 460 includes sub-step 465 in which I/O Coordination module 56 obtains disparate write buffer 84, which has a set of nodes 240, each having a write command (denoted by a write operation code 242) directed at a different low-level extent 234 (described by a physical destination extent descriptors 282) on the destination. Disparate write buffer 84 also includes one or more additional nodes 240 with (e.g., PFDC) metadata 244.

Then, in step 470, I/O Coordination module 56 sends a copy request to a physical storage driver 54 directing the physical storage driver 54 to copy data from the physical storage extent 134 of that storage extent descriptor 82 of the first set to the physical storage extents 234 of the second set. In sub-step 472, I/O Coordination module 56 modifies the nodes 240 of disparate write buffer 84 to become copy commands rather than write commands and inserting respective physical source descriptors 82(s)(t) for appropriate s, t as described above in connection with FIG. 3 (thereby creating modified disparate write buffer 85 having modified nodes 240'). In sub-step 474, I/O Coordination module 56 sends the modified disparate write buffer 85 (or, in other embodiments, copy commands derived from the modified nodes 240' of modified disparate write buffer 85, or just their arguments) as a copy instruction 86 to the lower arm 52 for the MLU 51 to pass on to the physical storage driver 54 for low-level processing.

Once the copy request is successfully completed, operation proceeds with step 480, in which the current physical source extent descriptor 82(x) is incremented to 82(x+1), and then operation loops back to step 450 until all physical source extent descriptors 82 of the first set have been looped through, at which point method 400 concludes.

Figure 6:
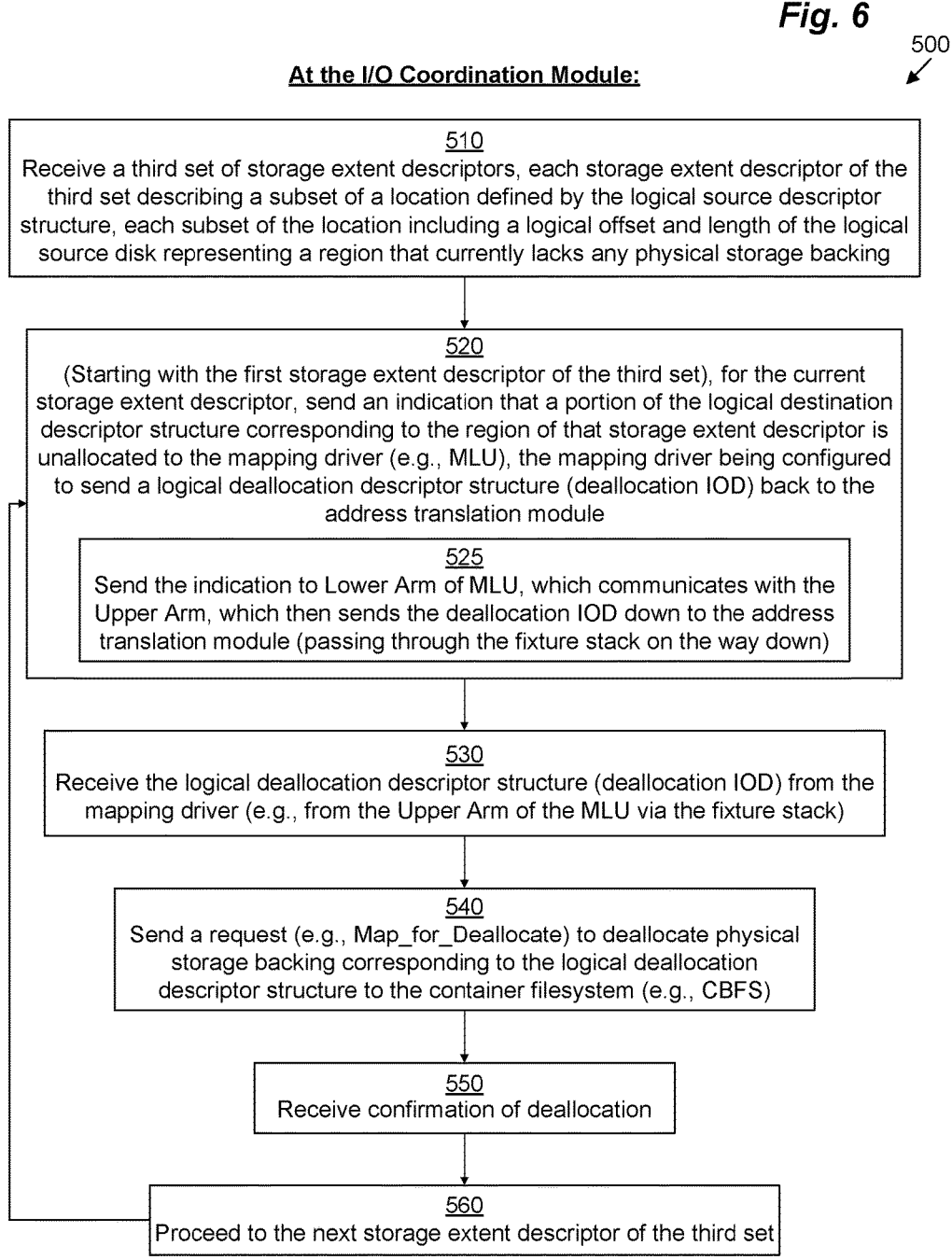
FIG. 6 is a flowchart depicting example methods of various embodiments.

FIG. 6 illustrates an example method 500 performed by computing device 32. It should be understood that, within FIG. 6, various steps or sub-steps of method 500 may be omitted in some embodiments. Similarly, in some embodiments, one or more steps or sub-steps may be combined together or performed in a different order. Method 500 is performed by computing device 32, more specifically by I/O Coordination module 56 running on processing circuitry 38 in conjunction with various other system components.

Method 500 may be performed in parallel with steps 440-480 of method 400. In step 510, I/O Coordination module 56 receives, in response to the Map_for_Read request 80 of step 430, a third set of storage extent descriptors (e.g., source extent descriptors 82) each storage extent descriptor 82 of the third set describing a subset 114 of region 112 defined by the logical source descriptor structure (e.g., source IOD 78), each subset 114 of the region 112 including a logical offset and length 124 on the logical source disk 110 representing a region 114 that currently lacks any physical storage backing (e.g., the physical source extent offset 122 for the physical source extent descriptor 82 corresponding to that region 114 is null or otherwise invalid indicating that the physical source extent descriptors 82 is for an unallocated region).

In step 520, I/O Coordination module 56 begins going through the unallocated region physical source extent descriptors 82 of the third set one at a time. For a current unallocated region physical source extent descriptor 82(x), I/O Coordination module 56 sends to the MLU 51 an indication that a portion of the region 212 of logical destination descriptor structure (e.g., destination IOD 77) corresponding to the region 114 of that unallocated region physical source storage extent descriptor 82 should be unallocated, the MLU 51 being configured to send a logical deallocation descriptor structure (deallocation IOD, not depicted) back to the I/O Coordination module 56. In some embodiments, this is accomplished via sub-step 525. In sub-step 525, the I/O Coordination module 56 sends the indication to the lower arm 52 of MLU 51, which communicated with the upper arm 50 of MLU 51, which is then able to pass the deallocation IOD (which it created by calling descriptor allocator 62) down the fixture stack 60 to the I/O Coordination module 56. By having the deallocation IOD pass through the fixture stack 60, the fixtures 61 may be made aware of the "hole" within the destination.

In step 530, I/O Coordination module 56 receives the deallocation IOD from the MLU 51 (e.g., from the upper arm 50 of the MLU 51 via the fixture stack 60). In response, in step 540, I/O Coordination module 56 sends a request to the container filesystem manager 58 (e.g., a Map_for_Deallocate call) to deallocate physical storage backing corresponding to a region define by the deallocation IOD. In response, in step 540, I/O Coordination module 56 receives a confirmation of the deallocation.

Operation then proceeds with step 560, in which the current unallocated region physical source extent descriptor 82 within the third set is incremented to the next element of the third set, and then operation loops back to step 520 until all unallocated region source extent descriptors 82 of the third set have been looped through, at which point method 500 concludes.

Thus, techniques have been presented for allowing a mapping driver 51 in a driver stack 46 to process and align physical storage extent divisions 114, 134, 214, 234 in both source and destination inter-driver calls 71, 73 from an XCOPY command 70 in order to make integrated copy calls 86, 87 down to a physical storage driver 54 at the bottom of the stack 46.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

It should be understood that all embodiments that have been described may be combined in all possible combinations with each other, except to the extent that such combinations have been explicitly excluded.

Finally, even if a technique, method, apparatus, or other concept is specifically labeled as "background" or "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method performed by an I/O Coordination module of a computing device operating as a data storage system, the method comprising:

receiving a logical source descriptor structure that specifies a logical source disk, a logical source offset, and a length for a copy operation, the logical source disk being provided by the computing device from physical storage of the computing device;

receiving a logical destination descriptor structure that specifies a logical destination disk and a logical destination offset for the copy operation;

requesting a physical mapping of the source descriptor structure from a container filesystem configured to present a file as a logical disk;

in response to requesting the physical mapping of the source descriptor structure, receiving a first set of storage extent descriptors, each storage extent descriptor of the first set describing a respective physical storage extent on the physical storage of the computing device, the first set representing a mapping of the source descriptor structure onto physical storage; and for each storage extent descriptor of the first set:
- requesting a physical mapping of a corresponding location of the logical destination descriptor structure from the container filesystem;
- in response to requesting the physical mapping of the corresponding location, receiving a second set of storage extent descriptors, each storage extent descriptor of the second set describing a respective physical storage extent on the physical storage of the computing device, the second set representing a mapping of the corresponding location of the destination descriptor structure onto physical storage; and
- sending, by the I/O Coordination module running on the computing device, a copy request to a physical storage driver also running on the computing device, the copy request directing the physical storage driver to copy data from the physical storage extent of that storage extent descriptor of the first set to the physical storage extents of the second set, the copy request causing the data to be copied directly from one physical storage extent of the physical storage of the computing device to another physical storage extent of the physical storage of the computing device without the data leaving the computing device.

2. The method of claim 1 wherein:

receiving the second set of storage extent descriptors includes receiving a buffer, the buffer including:
- a set of write commands respectively directed at the second set of storage extent descriptors; and
- metadata; and sending the copy request includes:
- modifying the set of write commands within the buffer to become copy commands respectively sourced from corresponding portions of the physical storage extent of that storage extent descriptor of the first set; and
- sending the metadata and the copy commands to the physical storage driver.

3. The method of claim 2 wherein:

receiving the logical source descriptor includes receiving the logical source descriptor from a mapping driver operating on the computing device;

receiving the logical destination descriptor structure includes receiving the logical source descriptor from the mapping driver; and sending the metadata and the copy commands to the physical storage driver includes sending the modified buffer to the mapping driver, the mapping driver being configured to:
- extract the metadata and the copy commands from the modified buffer; and
- send the metadata and the copy commands to the physical storage driver within an inter-driver packet.

4. The method of claim 1 wherein receiving the logical source descriptor includes receiving the logical source descriptor from a mapping driver operating on the computing device;

receiving the logical destination descriptor structure includes receiving the logical source descriptor from the mapping driver; and sending the copy request to the physical storage driver includes sending information to the mapping driver, the mapping driver being configured to:
- generate the copy request; and
- send the copy request to the physical storage driver within an inter-driver packet.

5. The method of claim 4 wherein the method further comprises:

in response to requesting the physical mapping of the source descriptor structure, further receiving a third set of storage extent descriptors, each storage extent descriptor of the third set describing a subset of a location defined by the logical source descriptor structure, each subset of the location including a logical offset and length of the logical source disk representing a region that currently lacks any physical storage backing; and for each storage extent descriptor of the third set:
- sending an indication that a portion of the logical destination descriptor structure corresponding to the region of that storage extent descriptor is unallocated to the mapping driver, the mapping driver being configured to send a logical deallocation descriptor structure back to the I/O Coordination module;
- receiving the logical deallocation descriptor structure from the mapping driver;
- sending a request to deallocate physical storage backing corresponding to the logical deallocation descriptor structure to the container filesystem; and
- in response to sending the request to deallocate, receiving confirmation of deallocation.

6. A computer program product comprising a non-transitory computer-readable storage medium storing instructions, which, when executed by a computing device cause the computing device to operate an I/O Coordination module of a data storage system by:

receiving a logical source descriptor structure that specifies a logical source disk, a logical source offset, and a length for a copy operation, the logical source disk being provided by the computing device from physical storage of the data storage system;

receiving a logical destination descriptor structure that specifies a logical destination disk and a logical destination offset for the copy operation;

requesting a physical mapping of the source descriptor structure from a container filesystem configured to present a file as a logical disk;

in response to requesting the physical mapping of the source descriptor structure, receiving a first set of storage extent descriptors, each storage extent descriptor of the first set describing a respective physical storage extent on the physical storage of the data storage system, the first set representing a mapping of the source descriptor structure onto physical storage; and for each storage extent descriptor of the first set:
- requesting a physical mapping of a corresponding location of the logical destination descriptor structure from the container filesystem;

in response to requesting the physical mapping of the corresponding location, receiving a second set of storage extent descriptors, each storage extent descriptor of the second set describing a respective physical storage extent on the physical storage of the data storage system, the second set representing a mapping of the corresponding location of the destination descriptor structure onto physical storage; and sending, by the I/O Coordination module running on the computing device, a copy request to a physical storage driver also running on the computing device, the copy request directing the physical storage driver to copy data from the physical storage extent of that storage extent descriptor of the first set to the physical storage extents of the second set, the copy request causing the data to be copied directly from one physical storage extent of the physical storage of the data storage system to another physical storage extent of the physical storage of the data storage system without the data leaving the data storage system.

7. The computer program product of claim 6 wherein:
receiving the second set of storage extent descriptors includes receiving a buffer, the buffer including:
  a set of write commands respectively directed at the second set of storage extent descriptors; and
  metadata; and
sending the copy request includes:
  modifying the set of write commands within the buffer to become copy commands respectively sourced from corresponding portions of the physical storage extent of that storage extent descriptor of the first set; and
  sending the metadata and the copy commands to the physical storage driver.

8. The computer program product of claim 7 wherein:
receiving the logical source descriptor includes receiving the logical source descriptor from a mapping driver operating on the computing device;
receiving the logical destination descriptor structure includes receiving the logical source descriptor from the mapping driver; and
sending the metadata and the copy commands to the physical storage driver includes sending the modified buffer to the mapping driver, the mapping driver being configured to:
  extract the metadata and the copy commands from the modified buffer; and
  send the metadata and the copy commands to the physical storage driver within an inter-driver packet.

9. The computer program product of claim 6 wherein
receiving the logical source descriptor includes receiving the logical source descriptor from a mapping driver operating on the computing device;
receiving the logical destination descriptor structure includes receiving the logical source descriptor from the mapping driver; and
sending the copy request to the physical storage driver includes sending information to the mapping driver, the mapping driver being configured to:
  generate the copy request; and
  send the copy request to the physical storage driver within an inter-driver packet.

10. The computer program product of claim 9 wherein the instructions, when executed by the computing device, further cause the computing device to:

in response to requesting the physical mapping of the source descriptor structure, further receive a third set of storage extent descriptors, each storage extent descriptor of the third set describing a subset of a location defined by the logical source descriptor structure, each subset of the location including a logical offset and length of the logical source disk representing a region that currently lacks any physical storage backing; and for each storage extent descriptor of the third set:
  send an indication that a portion of the logical destination descriptor structure corresponding to the region of that storage extent descriptor is unallocated to the mapping driver, the mapping driver being configured to send a logical deallocation descriptor structure back to the I/O Coordination module;
  receive the logical deallocation descriptor structure from the mapping driver;
  send a request to deallocate physical storage backing corresponding to the logical deallocation descriptor structure to the container filesystem; and
  in response to sending the request to deallocate, receive confirmation of deallocation.

11. An apparatus comprising:
persistent data storage; and
control circuitry coupled to memory configured to execute an I/O Coordination module of a data storage system by:
  receiving a logical source descriptor structure that specifies a logical source disk, a logical source offset, and a length for a copy operation, the logical source disk being provided by the apparatus from the persistent data storage;
  receiving a logical destination descriptor structure that specifies a logical destination disk and a logical destination offset for the copy operation;
  requesting a physical mapping of the source descriptor structure from a container filesystem configured to present a file as a logical disk;
  in response to requesting the physical mapping of the source descriptor structure, receiving a first set of storage extent descriptors, each storage extent descriptor of the first set describing a respective physical storage extent on the persistent data storage, the first set representing a mapping of the source descriptor structure onto the persistent data storage; and
  for each storage extent descriptor of the first set:
    requesting a physical mapping of a corresponding location of the logical destination descriptor structure from the container filesystem;
    in response to requesting the physical mapping of the corresponding location, receiving a second set of storage extent descriptors, each storage extent descriptor of the second set describing a respective physical storage extent of the persistent data storage, the second set representing a mapping of the corresponding location of the destination descriptor structure onto the persistent data storage; and
    sending, by the I/O Coordination module running on the control circuitry, a copy request to a physical storage driver also running on the control circuitry, the copy request directing the physical storage driver to copy data from the physical storage extent of that storage extent descriptor of the first set to the physical storage extents of the persistent data storage of the second set, the copy request causing the data to be copied directly from one physical storage extent of the persistent data storage to another physical storage extent of the persistent data storage without the data leaving the apparatus.

* * * * *